US011862115B2

(12) United States Patent
Adachi et al.

(10) Patent No.: US 11,862,115 B2
(45) Date of Patent: Jan. 2, 2024

(54) CIRCUIT DEVICE AND DISPLAY APPARATUS

(71) Applicant: SEIKO EPSON CORPORATION, Tokyo (JP)

(72) Inventors: Kentaro Adachi, Hara (JP); Kumar Anandabairavasamy Anand, Richmond (CA)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 18/103,514

(22) Filed: Jan. 31, 2023

(65) Prior Publication Data

US 2023/0245628 A1 Aug. 3, 2023

(30) Foreign Application Priority Data

Feb. 1, 2022 (JP) ................................ 2022-013949

(51) Int. Cl.
*G09G 3/34* (2006.01)

(52) U.S. Cl.
CPC ... *G09G 3/3426* (2013.01); *G09G 2320/0233* (2013.01); *G09G 2320/0242* (2013.01); *G09G 2320/0646* (2013.01); *G09G 2360/16* (2013.01)

(58) Field of Classification Search
CPC ......... G09G 3/3426; G09G 2320/0233; G09G 2320/0242; G09G 2320/0646; G09G 2360/16
See application file for complete search history.

(56) References Cited

U.S. PATENT DOCUMENTS

| | | | | |
|---|---|---|---|---|
| 8,471,807 | B2 * | 6/2013 | Seetzen ................ | G09G 3/3426 345/76 |
| 8,545,035 | B1 * | 10/2013 | Beguin ................ | G09G 3/3413 362/602 |
| 9,830,867 | B2 * | 11/2017 | Takasaki .............. | G09G 3/3413 |
| 10,121,421 | B2 * | 11/2018 | Takasaki .............. | G09G 3/3413 |
| 10,522,095 | B2 * | 12/2019 | Yata ..................... | G09G 3/3208 |
| 2009/0078852 | A1 * | 3/2009 | Lin ...................... | G09G 3/3413 250/205 |

FOREIGN PATENT DOCUMENTS

| | | |
|---|---|---|
| JP | 2009-294506 A | 12/2009 |
| JP | 2013-003472 A | 1/2013 |

* cited by examiner

*Primary Examiner* — Gene W Lee
(74) *Attorney, Agent, or Firm* — Harness, Dickey & Pierce, P.L.C.

(57) ABSTRACT

A circuit device is used in a display apparatus. The display apparatus includes a display panel and a backlight including a plurality of light sources. The plurality of light sources are respectively provided corresponding to a plurality of areas of the display panel. The circuit device includes a light amount abnormality detection circuit, a dimming circuit, and a color correction circuit. The light amount abnormality detection circuit detects a light amount abnormality of the light source. The dimming circuit performs light amount compensation processing of compensating for a light amount of an area corresponding to an abnormal light source by adjusting a light amount of a light source other than the abnormal light source that is a light source in which the light amount abnormality is detected. The color correction circuit performs color correction according to the adjusted light amount on image data of an area corresponding to an adjustment target light source that is the light source whose light amount is adjusted.

11 Claims, 12 Drawing Sheets

CIRCUIT DEVICE AND DISPLAY APPARATUS

The present application is based on, and claims priority from JP Application Serial Number 2022-013949, filed Feb. 1, 2022, the disclosure of which is hereby incorporated by reference herein in its entirety.

BACKGROUND

1. Technical Field

The present disclosure relates to a circuit device, a display apparatus, and the like.

2. Related Art

JP-A-2009-294506 discloses a display apparatus that adjusts display quality. The display apparatus monitors whether an abnormality occurs in any of a plurality of cold-cathode tubes of a backlight unit and normal light emission cannot be obtained. When an abnormality occurs, the display apparatus adjusts a power supply voltage supplied to a horizontal scanning unit, adjusts a video signal transmitted from the horizontal scanning unit to a pixel cell, or adjusts intensity of illumination light with which the backlight unit illuminates a display panel so as to correct a decrease in luminance of a display abnormality area of the display panel that may occur due to the occurrence of the abnormality in the cold-cathode tubes.

In JP-A-2009-294506 described above, when the abnormality occurs in the cold-cathode tubes, the luminance of the area on the display panel to be originally illuminated by the cold-cathode tubes decreases. JP-A-2009-294506 discloses that the decrease in the luminance is corrected by adjusting intensity of light emission of the cold-cathode tubes that are not abnormal. However, when the intensity of the light emission of the cold-cathode tubes that are not abnormal is adjusted, since the luminance of the area on the display panel illuminated by the cold-cathode tubes changes, display unevenness may occur, and display appears to be unnatural as a whole. JP-A-2009-294506 discloses that the decrease in the luminance due to the abnormal cold-cathode tube is corrected by adjusting the video signal transmitted from the horizontal scanning unit to the pixel cell. However, in a case where the intensity of the light emission of the cold-cathode tubes that are not abnormal is adjusted, adjusting the video signal according to that case is neither disclosed nor suggested.

SUMMARY

An aspect of the present disclosure relates to a circuit device used in a display apparatus, the display apparatus including a display panel and a backlight including a plurality of light sources and in which the plurality of light sources are respectively provided corresponding to a plurality of areas of the display panel. The circuit device includes: a light amount abnormality detection circuit configured to detect a light amount abnormality of the light source; a dimming circuit configured to perform light amount compensation processing of compensating for a light amount of an area corresponding to an abnormal light source by adjusting a light amount of a light source other than the abnormal light source that is a light source in which the light amount abnormality is detected; and a color correction circuit configured to perform color correction according to the adjusted light amount on image data of an area corresponding to an adjustment target light source that is the light source whose light amount is adjusted.

Another aspect of the present disclosure relates to a display apparatus including: the circuit device described above; the display panel configured to display an image based on the image data; and the backlight.

DESCRIPTION OF EXEMPLARY EMBODIMENTS

Hereinafter, a preferred embodiment according to the present disclosure will be described in detail. The present embodiment to be described below does not unduly limit contents described in claims, and not all configurations described in the present embodiment are necessarily essential constituent elements.

1. Display Apparatus

Figure 1:
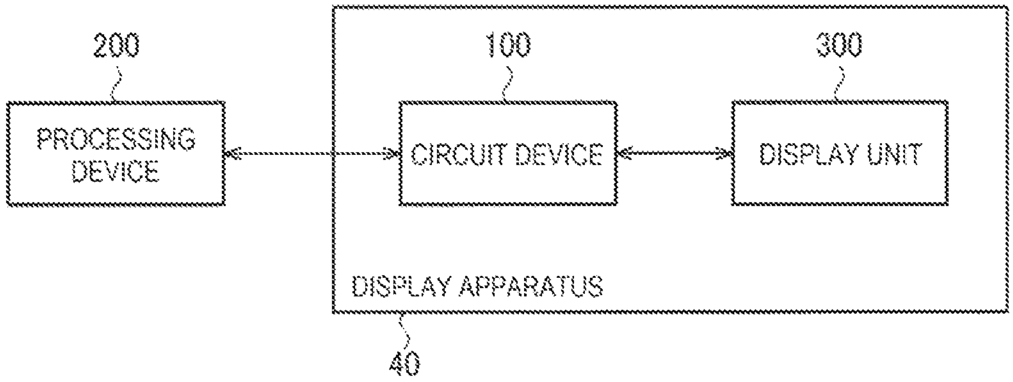
FIG. 1 shows a configuration example of a display apparatus.

FIG. 1 shows a configuration example of a display apparatus 40 including a circuit device 100 according to the present embodiment. The display apparatus 40 includes the circuit device 100 and a display unit 300.

A processing device 200 transmits image data to the circuit device 100 of the display apparatus 40. The processing device 200 is a so-called SoC, and is, for example, a processor such as a CPU or a microcomputer. The SoC is an abbreviation for a system on chip. The CPU is an abbreviation for a central processing unit.

The circuit device 100 acquires failure information on a light source of a backlight, and adjusts the backlight and performs color correction on the image data based on the failure information. The circuit device 100 transmits the color-corrected image data to the display unit 300. The circuit device 100 is, for example, an integrated circuit device in which a plurality of circuit elements are integrated on a semiconductor substrate.

The display unit 300 includes a display panel and the backlight, and displays the color-corrected image data from the circuit device 100 on the display panel. When the backlight emits light to the display panel and the light transmitted through the display panel is incident on eyes of a user, an image displayed on the display panel is visually recognized by the user.

The display apparatus 40 may be any apparatus as long as it is an apparatus that presents an image to the user based on the image data. As an example, the display apparatus 40 is an in-vehicle cluster panel, a television apparatus, a monitor of an information processing terminal, a projector, a head-up display apparatus, or the like. An example of the head-up display apparatus will be described later.

Figure 2:
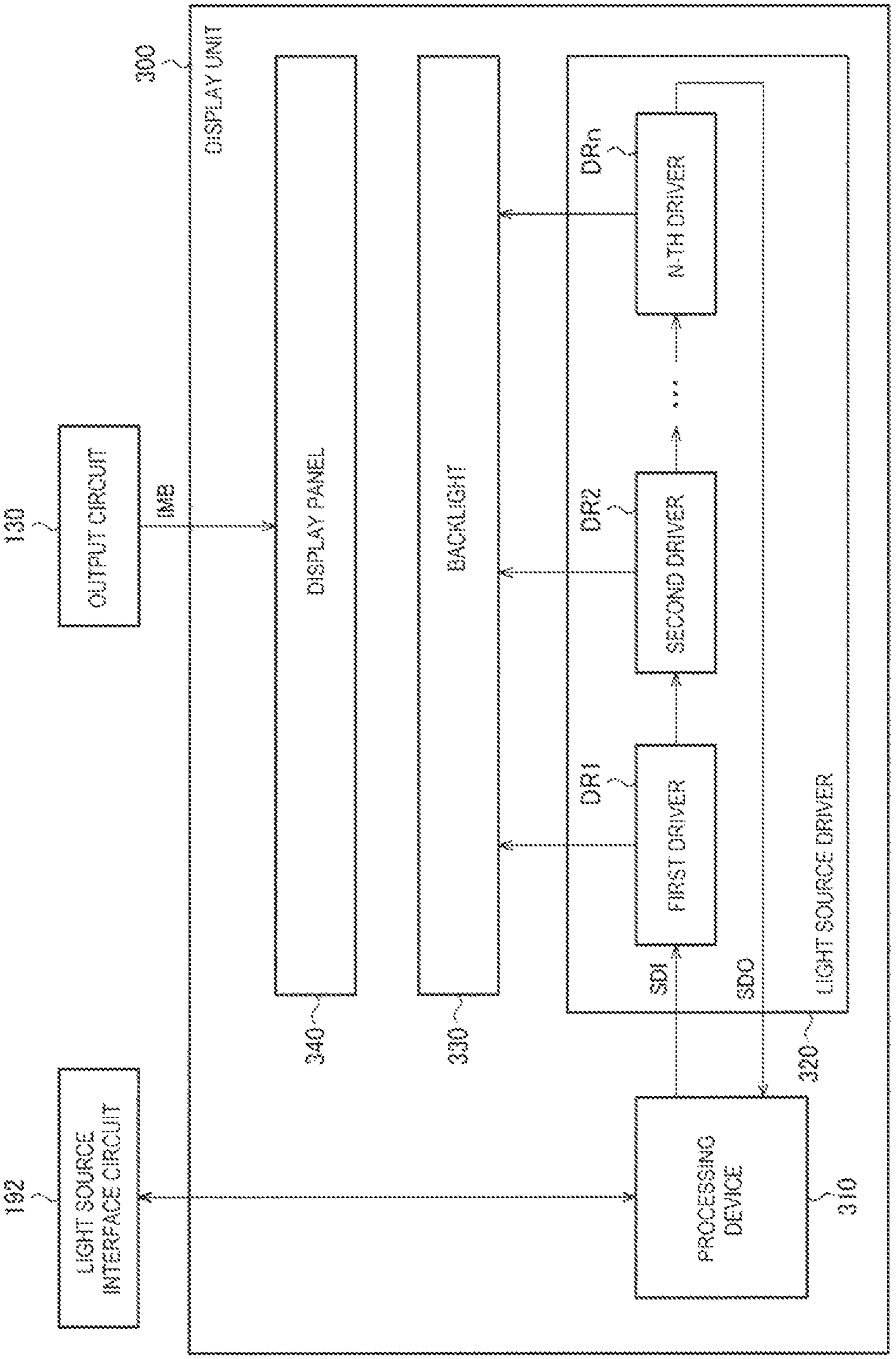
FIG. 2 shows a detailed configuration example of a display unit.

2. Detailed Configuration Example of Display Unit and First Detailed Configuration Example of Circuit Device FIG. 2 shows a detailed configuration example of the display unit 300. The display unit 300 includes a processing device 310, a light source driver 320, a backlight 330, and a display panel 340.

The processing device 310 performs conversion between a communication format used by a light source interface circuit 192 of the circuit device 100 and a communication format used by the light source driver 320. The processing device 310 is, for example, a processor such as a CPU or a microcomputer. The processing device 310 may be omitted, and the light source interface circuit 192 and the light source driver 320 may directly communicate with each other.

The backlight 330 includes a plurality of light sources two-dimensionally disposed in a plan view. Each light source is, for example, a light emitting element such as an LED. The LED is an abbreviation for a light emitting diode. The backlight 330 overlaps the display panel 340 such that a side on which the plurality of light sources are disposed faces the display panel 340 in a plan view. Accordingly, emitted light from the plurality of two-dimensionally disposed light sources is incident on the display panel 340. The two-dimensional arrangement of the light sources is, for example, a matrix arrangement, but is not limited thereto, and may be, for example, a staggered arrangement. The staggered arrangement is, for example, an arrangement in which the light sources are disposed in odd-numbered columns in odd-numbered rows and the light sources are disposed in even-numbered columns in even-numbered rows.

The light source driver 320 drives the light sources of the backlight 330 based on light source control data from the light source interface circuit 192. Further, the light source driver 320 detects a failure of each light source of the backlight 330, and transmits failure information thereon to the light source interface circuit 192. The light source driver 320 includes a first driver DR1 to an n-th driver DRn. n is an integer of 1 or more. Each driver is configured with, for example, an integrated circuit device.

Specifically, the first driver DR1 drives some light sources among the plurality of light sources of the backlight 330. The first driver DR1 independently turns on or off the light sources in charge. Further, the first driver DR1 causes the light sources in charge to emit light with a light amount set by the circuit device 100. The light amount can be independently set for each light source. The same applies to the second driver DR2 to the n-th driver DRn.

The first driver DR1 detects a failure of each light source in charge. The failure of the light source is a state in which the driver cannot control turning-on, turning-off, or the light amount of the light source. The failure of the light source is, for example, an open circuit and a short circuit of a light emitting element. The open circuit of the light emitting element is a state in which the light emitting element is turned off or cannot be controlled with a low light amount due to disconnection. The first driver DR1 detects the open circuit of the light emitting element by, for example, comparing an anode voltage of the light emitting element with an open circuit detection threshold voltage. The short circuit of the light emitting element is a state in which the light emitting element is turned on or cannot be controlled with a high light amount due to short circuit of a power supply and the like. The first driver DR1 detects the short circuit by, for example, comparing the anode voltage of the light emitting element with a short circuit detection threshold voltage. Alternatively, a failure of the light source may be a light amount abnormality of the light emitting element. The light amount abnormality is a state where a light amount is lower or higher than a light amount in a normal state. The first driver DR1 detects the light amount abnormality of the light emitting element by detection of a current that flows through the light emitting element or an optical sensor or the like.

The first driver DR1 to the n-th driver DRn are connected for cascade communication. That is, the first driver DR1 receives input data SDI such as the light source control data from the processing device 310, and transmits the input data SDI to the second driver DR2, which is repeated until the n-th driver DRn, so that the input data SDI is transmitted to the first driver DR1 to the n-th driver DRn. Further, the first driver DR1 transmits output data such as the failure information on the light source to the second driver DR2. The second driver DR2 adds transmission data of the second driver DR2 to transmission data from the first driver DR1 to transmit the added transmission data to the third driver DR3, which is repeated until the n-th driver DRn. The n-th driver DRn transmits output data SDO including output data of the first driver DR1 to the n-th driver DRn to the processing device 310. A communication connection method between the processing device 310 and the first driver DR1 to the n-th driver DRn is not limited to the above, and connection methods of various communication methods may be adopted.

The display panel 340 is, for example, a liquid crystal display panel. The liquid crystal display panel may be of a transmissive type or a reflective type. The display unit 300 includes a display controller and a display driver, which are not shown. The display controller outputs, to the display driver, output image data IMB from an output circuit 130 and a timing control signal for controlling a display timing. The display driver drives the display panel 340 based on the output image data IMB and the timing control signal, and causes the display panel 340 to display an image based on the output image data IMB. A function of the display controller may be incorporated in the circuit device 100.

Figure 3:
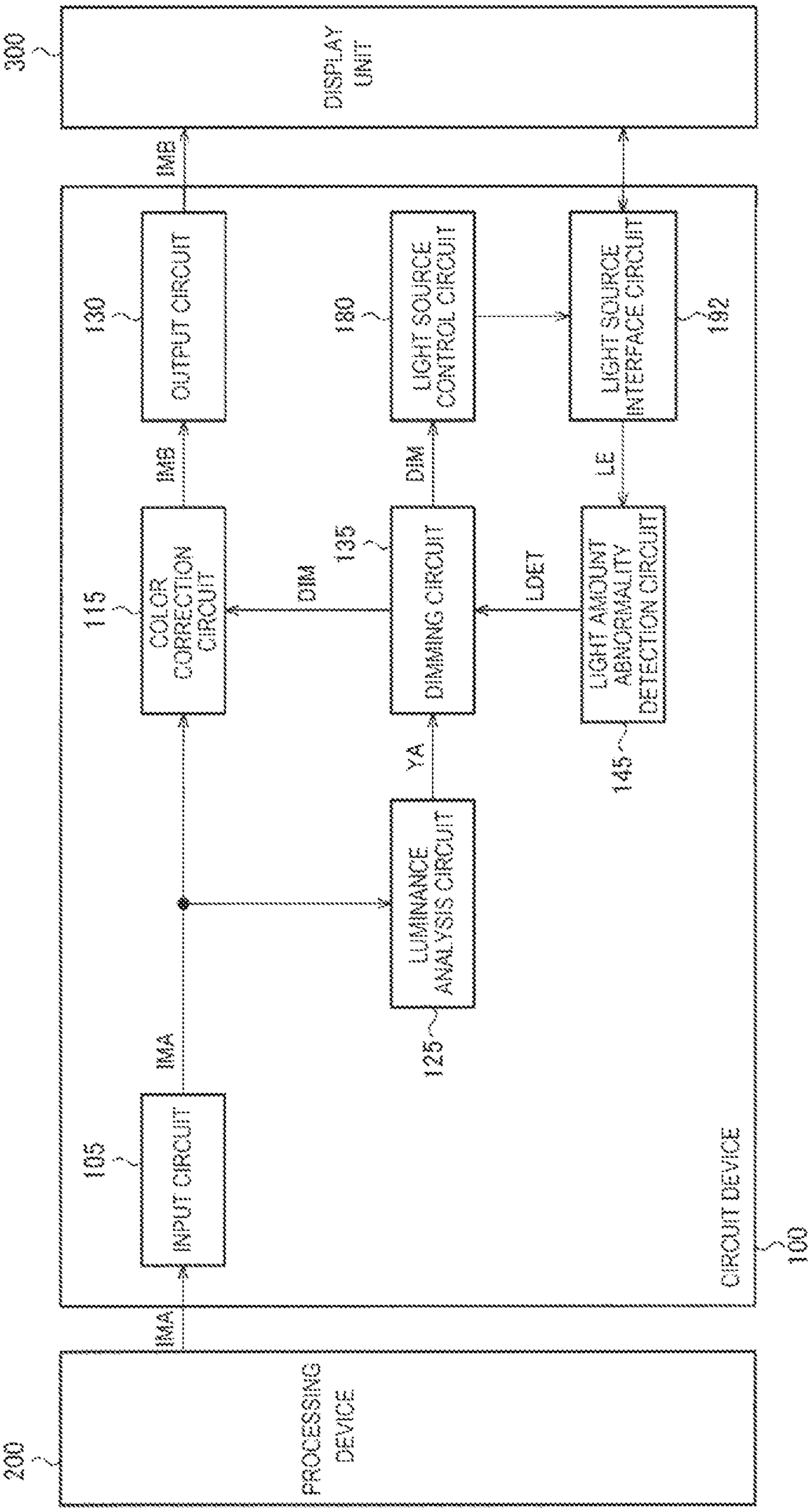
FIG. 3 shows a first detailed configuration example of a circuit device.

FIG. 3 shows a first detailed configuration example of the circuit device 100. The circuit device 100 includes an input circuit 105, a color correction circuit 115, a luminance analysis circuit 125, an output circuit 130, a dimming circuit 135, a light amount abnormality detection circuit 145, a light source control circuit 180, and the light source interface circuit 192.

The input circuit 105 receives input image data IMA from the processing device 200. The input circuit 105 may be a reception circuit for various communication interfaces, and is, for example, a reception circuit for an LVDS, a DVI, a display port, a GMSL, a GVIF, or the like. The LVDS is an abbreviation for a low voltage differential signaling, the DVI is an abbreviation for a digital visual interface, the GMSL is an abbreviation for a gigabit multimedia serial link, and the GVIF is an abbreviation for a gigabit video interface.

The light source interface circuit 192 communicates with the light source driver 320 via the processing device 310 of the display unit 300. The light source interface circuit 192 may be various communication interfaces used for communication between circuit devices, and is, for example, SPI or I2C. The SPI is an abbreviation for a serial peripheral interface. The I2C is an abbreviation for an inter integrated circuit. The light source interface circuit 192 and a host interface circuit 191 are not limited to the separately provided interface circuits, and may be one common interface circuit.

The light amount abnormality detection circuit 145 acquires failure information LE on each light source of the backlight 330 from the light source driver 320 via the processing device 310 and the light source interface circuit 192. The failure information LE includes information indicating a position of each light source of the backlight 330, and information indicating whether each light source is normal, is in an open circuit state, is in a short circuit state, or has an abnormal light amount. The light amount abnormality detection circuit 145 detects a light amount abnormality based on the failure information LE, and outputs a detection result LDET thereof to the dimming circuit 135. That is, when receiving the failure information LE including information on an abnormal light source, the light amount abnormality detection circuit 145 outputs information indicating a position of the abnormal light source and information indicating whether the abnormal light source is in the open circuit state, is in the short circuit state, or has the light amount abnormality.

The luminance analysis circuit 125 analyzes luminance of input image data IMA, and outputs an analysis result thereof as luminance information YA. An example of the luminance information YA is a luminance image indicating a luminance value of each pixel, a luminance value of each area illuminated by each light source of the backlight 330, or the like.

The dimming circuit 135 dims the light sources of the backlight 330 based on the luminance information YA. For example, the dimming circuit 135 turns off a light source corresponding to an area of black data in the luminance information YA. Alternatively, the dimming circuit 135 may perform local dimming control for adjusting a light amount of each light source based on the luminance information YA of an area illuminated by each light source. Further, the dimming circuit 135 compensates for an insufficient light amount or an excessive light amount of an area illuminated by an abnormal light source by adjusting light amounts of normal light sources around the abnormal light source based on the detection result LDET of the light amount abnormality. The dimming circuit 135 outputs light amount information DIM of the light sources determined by dimming and light amount compensation.

The light source control circuit 180 transmits the light source control data based on the light amount information DIM of the light sources to the light source driver 320 via the light source interface circuit 192 and the processing device 310. The light source control data is data for controlling turning-on, turning-off, or light amounts of the light sources of the backlight 330.

The color correction circuit 115 performs the color correction on the input image data IMA based on the light amount information DIM of the light sources. The color correction is to correct color data of RGB colors. The color correction based on the light amount information DIM is mainly to correct a luminance value of each pixel of the input image data IMA based on the light amount information DIM. However, when a color balance changes according to a light amount, color correction for canceling the change may be performed. The color correction circuit 115 performs the color correction on the input image data IMA such that a display image of the display unit 300 does not substantially change even when the light amounts of the light sources are adjusted. That is, the color correction is performed such that an appearance when light emission of the backlight 330 is uniform and the input image data IMA is displayed as it is substantially the same as an appearance when the light amounts of the light sources of the backlight 330 are adjusted and the image data is color-corrected.

The output circuit 130 transmits the image data from the color correction circuit 115 to the display unit 300 as the output image data IMB. The output circuit 130 may be a transmission circuit for various communication interfaces, and is, for example, a transmission circuit for an LVDS, a DVI, a display port, a GMSL, a GVIF, or the like.

The color correction circuit 115, the luminance analysis circuit 125, the dimming circuit 135, the light amount abnormality detection circuit 145, and the light source control circuit 180 are logic circuits. Each of these circuits may be configured as an individual logic circuit, or may be configured as a logic circuit integrated by automatic arrangement wiring or the like. Further, some or all of these circuits may be implemented by a processor such as a DSP. The DSP is an abbreviation for a digital signal processor. In this case, a program or an instruction set in which a function of each circuit is described is stored in a memory, and the function of each circuit is implemented by a processor executing the program or the instruction set.

In the above description, although an example in which the circuit device 100 performs dimming control such as local dimming and handles a light amount abnormality has been described, the circuit device 100 may handle the light amount abnormality without performing the dimming control such as the local dimming. In this case, the luminance analysis circuit 125 may be omitted.

3. Detailed Example of Processing Performed by Circuit Device of First Detailed Configuration Example Hereinafter, a detailed example of processing performed by the circuit device 100 of the first detailed configuration example will be described. Hereinafter, a case where a plurality of light sources 332 of the backlight are disposed in a matrix will be described as an example.

Figure 4:
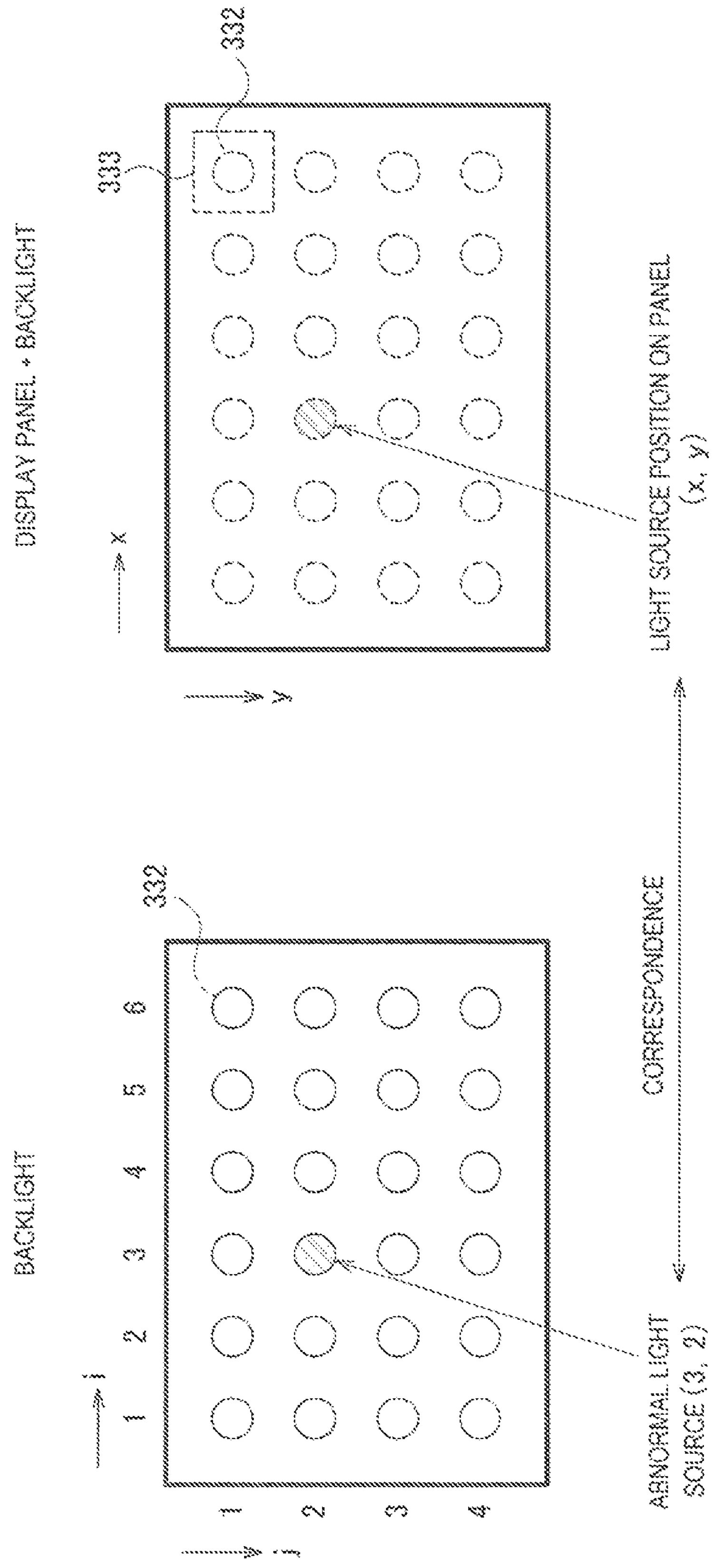
FIG. 4 is a diagram illustrating a correspondence between failure information and a light source position on a display panel.

FIG. 4 is a diagram illustrating a correspondence between the failure information and a light source position on the display panel. As shown in a left diagram, a column number of a light source matrix is set as i, a row number is set as j, and a light source position on the backlight is indicated by (i, j). i and j are integers of 1 or more. FIG. 4 shows an example in which a light source of (3, 2) is an abnormal light source. The failure information acquired by the light amount abnormality detection circuit 145 includes the position (3, 2) of the abnormal light source and a flag indicating whether the abnormal light source is in an open circuit state, is in a short circuit state, or has a light amount abnormality. There may be 2 or more abnormal light sources.

As shown in a right diagram of FIG. 4, the backlight overlaps a back surface of the display panel in a plan view of the display panel. The light source 332 illuminates an area 333 on the display panel. A size of the area 333 may be fixed or may be changed according to a light amount of the light source 332. The right diagram of FIG. 4 shows only one area 333, but there are areas corresponding to the light sources 332.

Pixel coordinates of the display panel are indicated by (x, y). x indicates a coordinate in a horizontal scanning direction, and y indicates a coordinate in a perpendicular scanning direction. It is assumed that the horizontal scanning direction is parallel to a row of the light source matrix. At this time, the light source position (i, j) on the backlight corresponds to the pixel coordinates (x, y) on the display panel in a plan view. Based on the correspondence, a position information acquisition circuit 160 converts the position (3, 2) of the abnormal light source into the light source position on the display panel.

Figure 5:
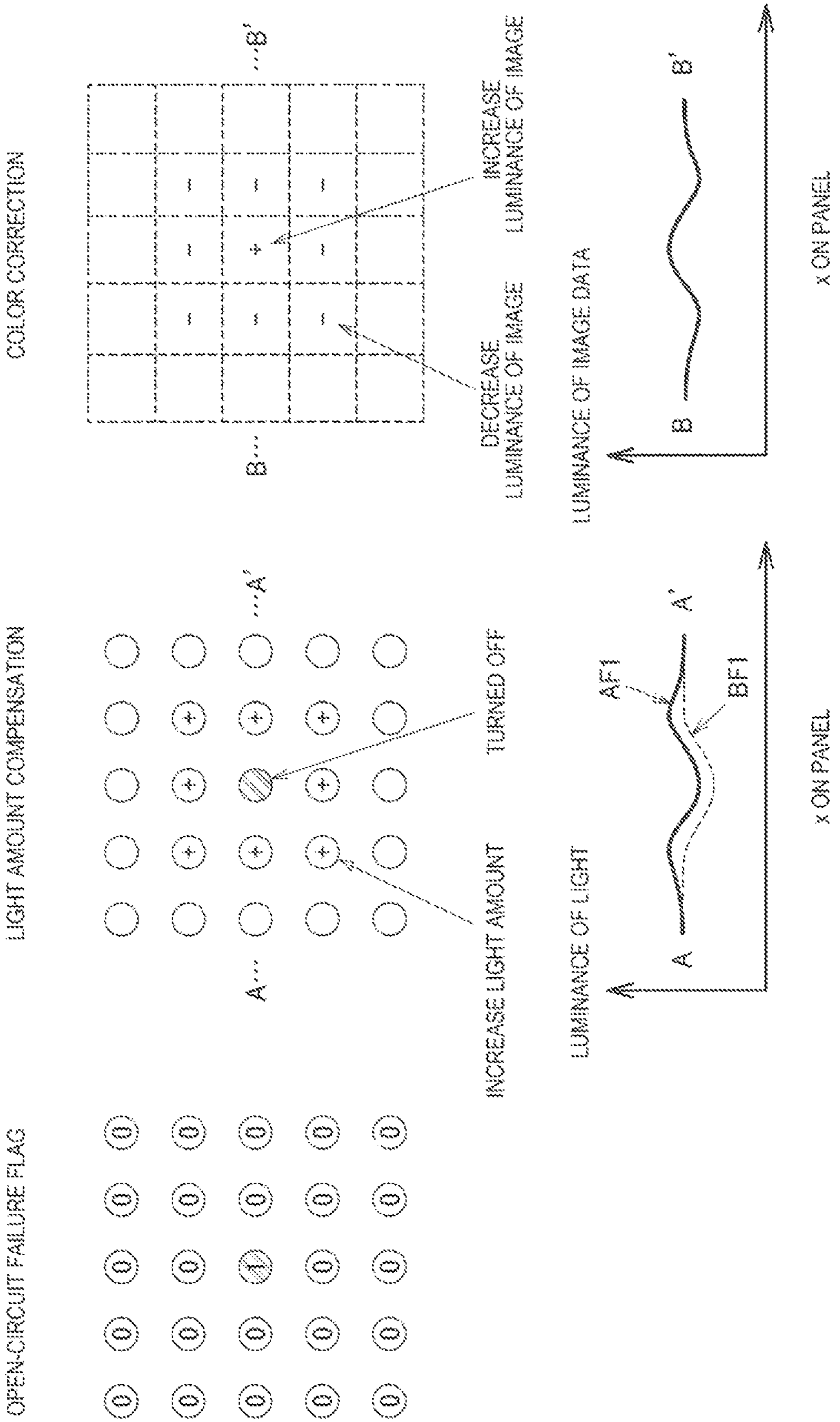
FIG. 5 shows a first example of processing performed by the circuit device of the first detailed configuration example when a light amount abnormality occurs.

FIG. 5 shows a first example of the processing performed by the circuit device 100 of the first detailed configuration example when a light amount abnormality occurs. Here, a processing example in a case where the light emitting element is turned off due to an open circuit of the light emitting element will be described. In a case of an abnormality in which the light emitting element becomes darker than usual, the abnormality can also be handled in a similar way.

An upper left part shows an example of the failure information. Each circle indicates a light source, and a number in the circle indicates an open-circuit failure flag. "0" indicates that the light source is normal, and "1" indicates that the light source has the open circuit.

An upper middle part shows an example of the light amount compensation. The dimming circuit 135 increases light amounts of eight light sources around the abnormal light source. The light sources whose light amounts are adjusted are referred to as adjustment target light sources. When causing the backlight 330 to emit flat light, the dimming circuit 135 increases the light amounts of the adjustment target light sources with reference to a light amount of the backlight 330. Alternatively, when the dimming such as the local dimming is performed, the dimming circuit 135 increases the light amounts of the adjustment target light sources with reference to a light amount determined by the dimming. Not only the eight light sources around the abnormal light source but also light sources further around the eight light sources may be included in the adjustment target light sources.

A lower middle part shows illumination luminance of the display panel at a cross section AA' of the upper middle part. The cross section AA' is a cross section along an x coordinate direction of the display panel. BF1 indicates a luminance distribution before the light amount adjustment. In an area corresponding to an abnormal light source turned off due to an open circuit failure, illumination luminance of the display panel decreases. AF1 indicates a luminance distribution after the light amount adjustment. Since the light amounts of the adjustment target light sources are increased, the illumination luminance of the display panel increases in the area corresponding to the abnormal light source and areas corresponding to the adjustment target light sources.

An upper right part shows an example of the color correction. Each cell indicated by a dotted line indicates an area on the display panel illuminated by a light source. It is described that areas of the light sources do not overlap with one another in FIG. 5, but the areas of the light sources may overlap with one another. The color correction circuit 115 performs color correction of increasing luminance on image data of the area corresponding to the abnormal light source turned off due to the open circuit failure. Further, the color correction circuit 115 performs color correction of decreasing luminance on image data of the areas corresponding to the adjustment target light sources. When the illumination luminance is sufficiently compensated in the area corresponding to the abnormal light source, the color correction circuit 115 may not correct luminance of the image data of the area.

Color correction of increasing or decreasing the luminance of the image data when the dimming such as the local dimming is performed means an increase or a decrease in luminance with reference to image data after color correction according to the dimming. However, since the dimming circuit 135 outputs the light amount information DIM of the light sources in which the dimming and the light amount compensation are combined, the color correction circuit 115 can perform the color correction according to the dimming and the light amount compensation based on the light amount information DIM of the light sources. FIG. 5 only shows a part of the color correction according to the light amount compensation between the dimming and the light amount compensation.

A lower right part indicates luminance of image data after the luminance adjustment at a cross section BB' of the upper right part. The cross section BB' is a cross section along the x coordinate direction of the display panel. As shown in the lower middle part and the lower right part, the luminance of the image data is increased in the area in which the illumination luminance is decreased, and the luminance of the image data is decreased in the areas in which the illumination luminance is increased. Since a result obtained by combining an image displayed on the display panel 340 based on the image data and illumination performed by the backlight 330 is visually recognized by the user, a result of the color correction and a result of the light amount compensation cancel each other. Accordingly, even if an abnormality occurs in the light source, it is possible to provide a natural display image as if no abnormality occurs in the light source.

Figure 6:
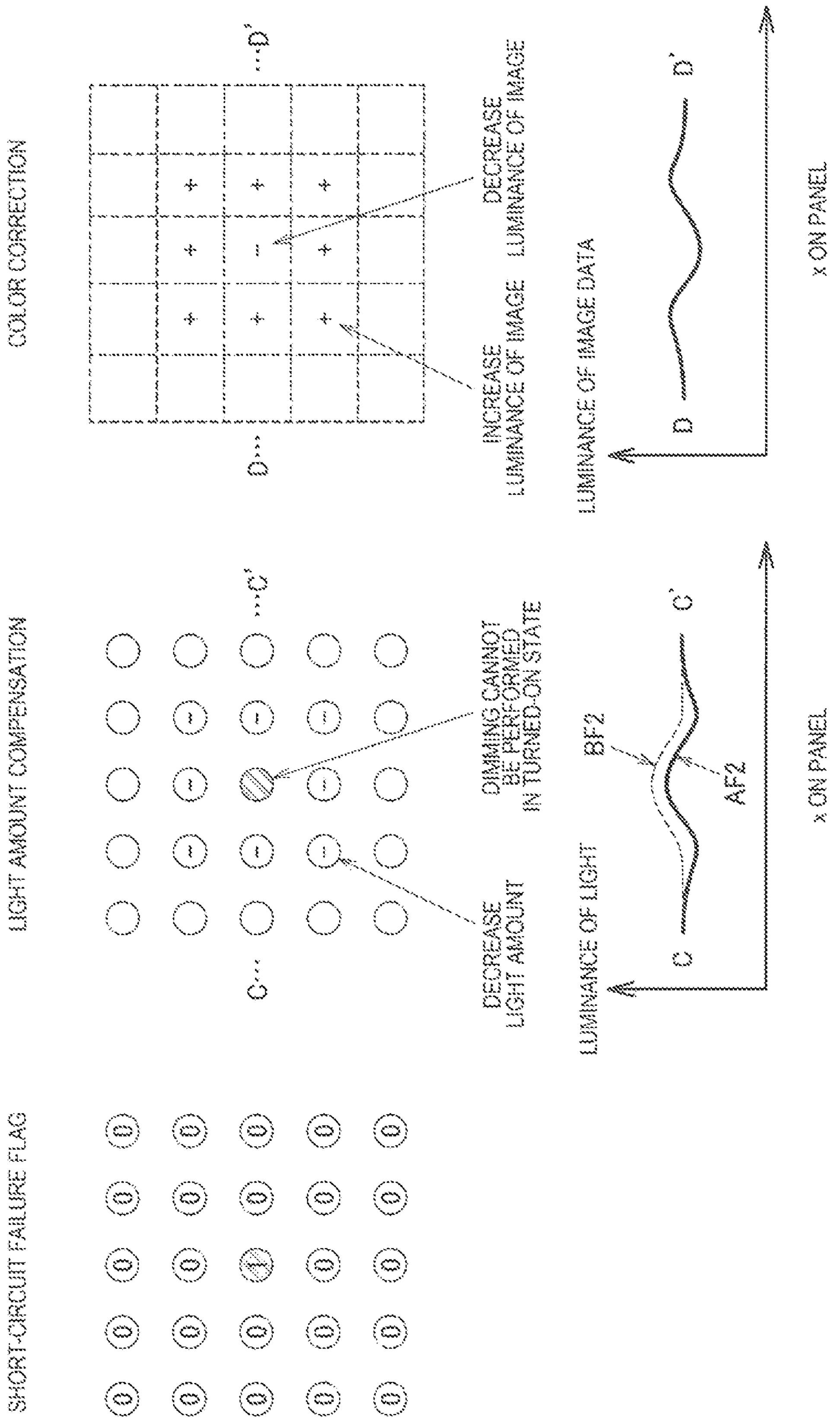
FIG. 6 shows a second example of the processing performed by the circuit device of the first detailed configuration example when a light amount abnormality occurs.

FIG. 6 shows a second example of the processing performed by the circuit device 100 of the first detailed configuration example when a light amount abnormality occurs. Here, a processing example when control cannot be performed in a light-turned-on state due to the short circuit of the light emitting element is shown. In a case of an abnormality in which the light emitting element is brighter than usual, the abnormality can also be handled in a similar way.

An upper left part shows an example of the failure information. Each circle indicates a light source, and a number in the circle indicates a short-circuit failure flag. "0" indicates that the light source is normal, and "1" indicates that the light source has the short circuit.

An upper middle part shows an example of the light amount compensation. The dimming circuit 135 decreases the light amounts of the eight adjustment target light sources around the abnormal light source. When causing the backlight 330 to emit the flat light, the dimming circuit 135 decreases the light amounts of the adjustment target light sources with reference to the light amount of the backlight 330. Alternatively, when performing the dimming such as the local dimming, the dimming circuit 135 decreases the light amounts of the adjustment target light sources with reference to a light amount determined by the dimming.

A lower middle part indicates illumination luminance on the display panel at a cross section CC' of the upper middle part. The cross section CC' is a cross section along the x coordinate direction of the display panel. BF2 indicates a luminance distribution before the light amount adjustment. In an area corresponding to an abnormal light source turned off due to a short-circuit failure, the illumination luminance on the display panel is increased. AF2 indicates a luminance distribution after the light amount adjustment. Since the light amounts of the adjustment target light sources are decreased, the illumination luminance on the display panel is decreased in the area corresponding to the abnormal light source and the areas corresponding to the adjustment target light sources.

An upper right part shows an example of the color correction. Each cell indicated by a dotted line indicates an area on the display panel illuminated by a light source. It is described that the areas of the light sources do not overlap with one another in FIG. 6, but the areas of the light sources may overlap with one another. The color correction circuit 115 performs the color correction of decreasing luminance on image data of an area corresponding to an abnormal light source turned on due to the short-circuit failure. Further, the color correction circuit 115 performs the color correction of increasing luminance on image data of the areas corresponding to the adjustment target light sources. When the illumination luminance is sufficiently compensated in the area corresponding to the abnormal light source, the color correction circuit 115 may not correct the luminance of the image data of the area.

A lower right part indicates luminance of image data after the luminance adjustment at a cross section DD' of the upper right part. The cross section DD' is a cross section along the x coordinate direction of the display panel. As shown in the lower middle part and the lower right part, the luminance of the image data is decreased in the area in which the illumination luminance is increased, and the luminance of the image data is increased in the areas in which the illumination luminance is decreased. Since a result obtained by combining an image displayed on the display panel 340 based on the image data and illumination performed by the backlight 330 is visually recognized by the user, a result of the color correction and a result of the light amount compensation cancel each other. Accordingly, even if an abnormality occurs in the light source, it is possible to provide a natural display image as if no abnormality occurs in the light source.

In the present embodiment described above, the circuit device 100 is used in the display apparatus 40. The display apparatus 40 includes the display panel 340 and the backlight 330 including the plurality of light sources. The plurality of light sources 332 are respectively provided corresponding to a plurality of the areas 333 of the display panel 340. The circuit device 100 includes the light amount abnormality detection circuit 145, the dimming circuit 135, and the color correction circuit 115. The light amount abnormality detection circuit 145 detects a light amount abnormality of each light source 332. The dimming circuit 135 performs the light amount compensation processing of compensating for the light amount of the area corresponding to the abnormal light source by adjusting the light amounts of the light sources other than the abnormal light source that is the light source in which the light amount abnormality is detected. The color correction circuit 115 performs the color correction according to the adjusted light amounts on the image data of the areas corresponding to the adjustment target light sources that are the light sources whose light amounts are adjusted.

According to the present embodiment, the light amount of the area corresponding to the abnormal light source is compensated, and the color correction is performed according to the adjusted light amounts on the image data of the areas corresponding to the adjustment target light sources. Accordingly, since a result of the color correction and a result of the light amount compensation cancel each other, even if an abnormality occurs in the light source, it is possible to provide a natural display image as if no abnormality occurs in the light source.

In the present embodiment, the dimming circuit 135 performs the light amount compensation processing by setting the light sources around the abnormal light source among the plurality of light sources as the adjustment target light sources.

An area illuminated by a certain light source and an area illuminated by a light source around the certain light source normally overlap each other on the display panel 340. Therefore, the light amount of the area corresponding to the abnormal light source is compensated by adjusting the light amounts of the light sources around the abnormal light source.

In the present embodiment, the color correction circuit 115 performs the color correction of decreasing the luminance of the image data of the areas corresponding to the adjustment target light sources when the dimming circuit 135 increases the light amounts of the adjustment target light sources.

According to the present embodiment, the increase in the light amount because of the light amount compensation and the decrease in the luminance of the image data because of the color correction cancel each other in the areas corresponding to the adjustment target light sources. Accordingly, even if the open-circuit failure or the abnormality of the light amount decrease occurs in the light source, it is possible to provide a natural display image.

In the present embodiment, the color correction circuit 115 performs the color correction of increasing the luminance of the image data of the areas corresponding to the adjustment target light sources when the dimming circuit 135 decreases the light amounts of the adjustment target light sources.

According to the present embodiment, the decrease in the light amount because of the light amount compensation and the increase in the luminance of the image data because of the color correction cancel each other in the areas corresponding to the adjustment target light sources. Accordingly, even if the short-circuit failure or the abnormality of the light amount increase occurs in the light source, it is possible to provide a natural display image.

In the present embodiment, the dimming circuit 135 performs the dimming control of controlling the light amount of each light source 332 based on the image data of each area 333. The color correction circuit 115 performs the color correction on the image data of each area based on the light amount controlled by the dimming control.

According to the present embodiment, it is possible to perform the dimming control such as the local dimming. The light amount compensation and the color correction accompanying the light amount compensation have a mechanism similar to the light amount control in the dimming control and the color correction of the image data according to the light amount control. Therefore, the dimming circuit 135 used for the dimming control and the color correction circuit 115 can be used in combination for the light amount compensation and the color correction accompanying the light amount compensation.

In the present embodiment, the circuit device 100 includes the light source interface circuit 192. The light source interface circuit 192 performs interface processing with the light source driver 320 that drives the plurality of light sources. The light amount abnormality detection circuit 145 acquires the failure information LE on the light sources 332 from the light source driver 320 via the light source interface circuit 192, and detects a light amount abnormality based on the failure information LE.

According to the present embodiment, the light amount abnormality detection circuit 145 can acquire the failure information LE on the light sources detected by the light source driver 320 via the light source interface circuit 192. The light amount abnormality detection circuit 145 can detect the light amount abnormality based on the failure information LE.

In the present embodiment, the failure information LE includes at least one of open-circuit information and short-circuit information of the light emitting element of each light source 332.

According to the present embodiment, the light amount abnormality detection circuit 145 can detect whether a light emitting element of a light source in which an abnormality has occurred has the open circuit or the short circuit. Accordingly, the dimming circuit 135 can execute the light amount compensation according to content of an abnormality.

4. Head-Up Display Apparatus

Figure 7:
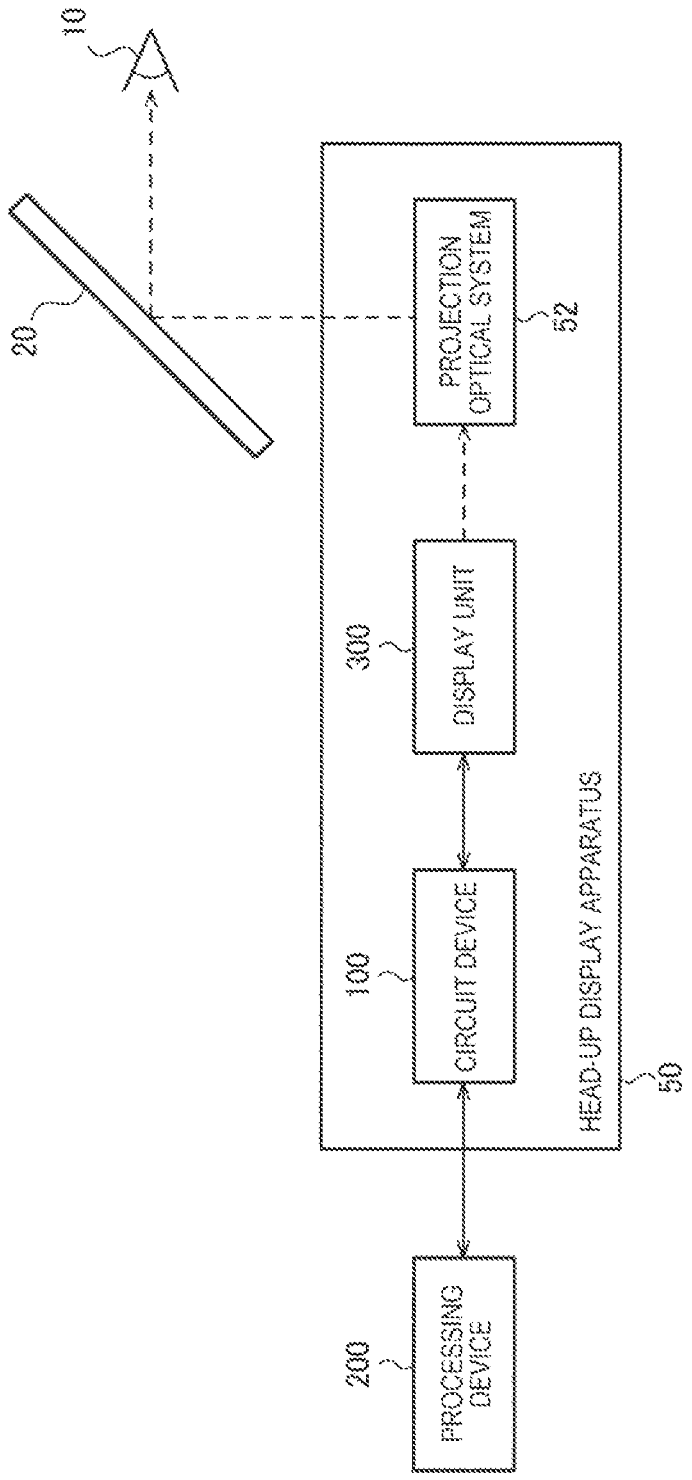
FIG. 7 shows a configuration example of a head-up display apparatus.

FIG. 7 shows a configuration example of a head-up display apparatus 50 as an example of the display apparatus including the circuit device 100 according to the present embodiment. The head-up display apparatus 50 includes the circuit device 100, the display unit 300, and a projection optical system 52. Description of parts similar to those in the configuration example of FIG. 1 is omitted.

The circuit device 100 performs distortion correction on image data received from the processing device 200, and transmits the image data after the distortion correction to the display unit 300. The distortion correction is image correction for performing HUD display with no or reduced distortion by applying, to an image, image distortion inverse to image distortion when an image displayed on a display panel is projected. The HUD is an abbreviation for head-up display. The image distortion due to projection includes image distortion due to a curved surface of a screen image distortion due to the projection optical system 52, or both of them.

The display unit 300 displays the image data after the distortion correction from the circuit device 100 on the display panel. The backlight emits light to the display panel. The projection optical system 52 includes a reflection plate and the like. The reflection plate reflects light transmitted through the display panel toward the screen 20, and the light reflected by the screen 20 is incident on eyes 10 of a user. Accordingly, a virtual image corresponding to an image displayed on the display panel is projected to a field of view of the user. The screen 20 transmits light from a real space that is a background of the HUD display. Accordingly, the virtual image created by the HUD appears to overlap the real space from the eyes 10 of the user. The screen 20 is, for example, a windscreen of a moving object on which the head-up display apparatus 50 is mounted.

Although an example in which there is one abnormal light source has been shown in FIGS. 5 and 6, the present embodiment can also be applied to a case where there are a plurality of abnormal light sources. For example, when the plurality of abnormal light sources are scattered, the light amount compensation may be performed using light sources around each abnormal light source, and image data may be color-corrected in an area in which the light amount compensation has been performed. Alternatively, when the plurality of abnormal light sources exist side by side, the light amount compensation may be performed using light sources around the plurality of abnormal light sources, and the image data may be color-corrected in an area in which the light amount compensation has been performed. For example, when light sources in one vertical column fail, the light amount compensation may be performed using light sources in two columns on both sides of the light sources in one vertical column, and the image data may be color-corrected in an area in which the light amount compensation has been performed.

5. Second Detailed Configuration Example of Circuit Device

Figure 8:
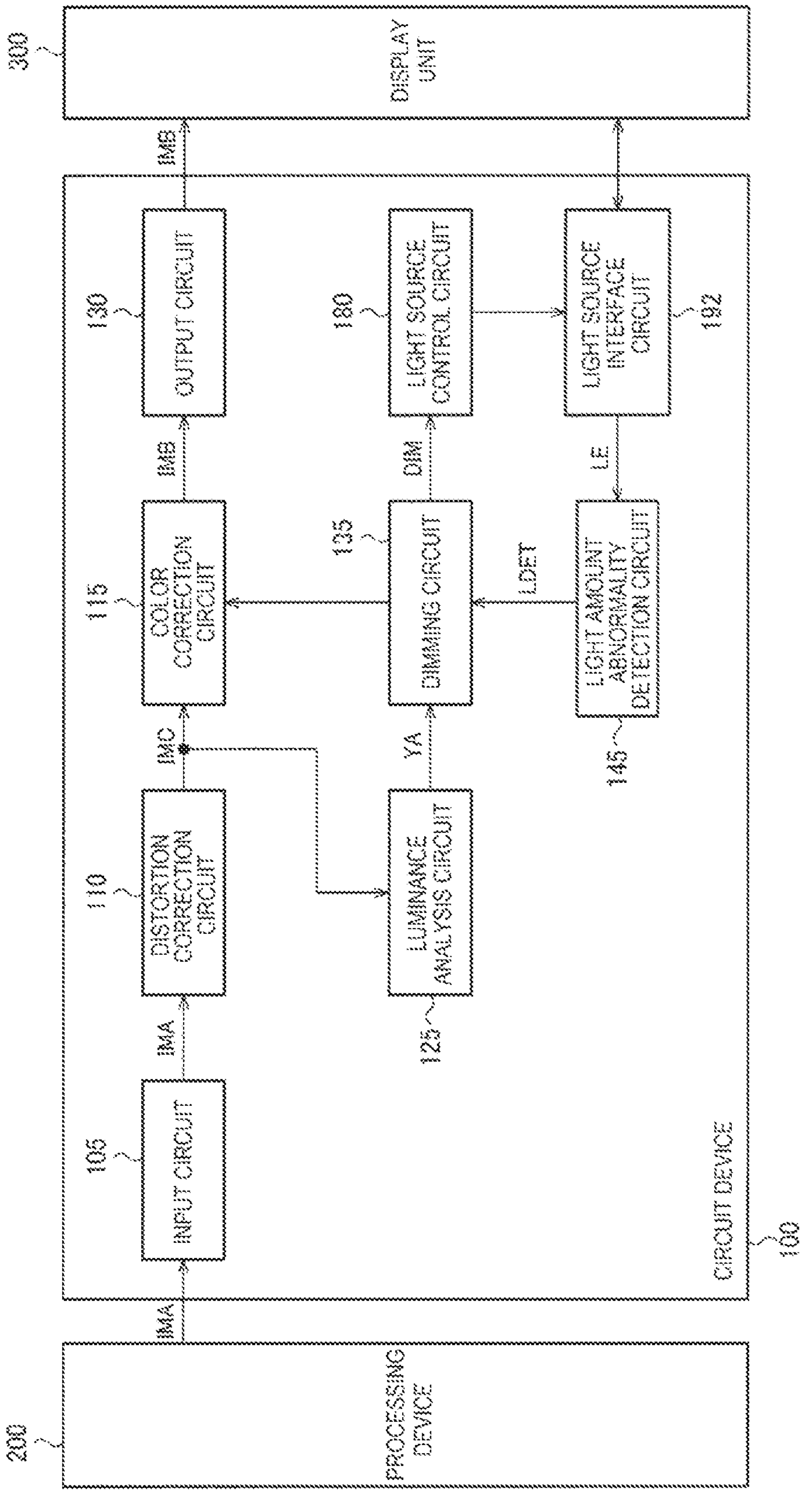
FIG. 8 shows a second detailed configuration example of the circuit device.

FIG. 8 shows a second detailed configuration example of the circuit device 100 that can be applied to the head-up display apparatus 50 or the like. The circuit device 100 includes the input circuit 105, a distortion correction circuit 110, the color correction circuit 115, the luminance analysis circuit 125, the output circuit 130, the dimming circuit 135, the light amount abnormality detection circuit 145, the light source control circuit 180, and the light source interface circuit 192. Description of parts similar to those in the configuration example of FIG. 3 is omitted.

The distortion correction circuit 110 performs the distortion correction on the input image data IMA by using coordinate conversion between pixel coordinates of the input image data IMA and pixel coordinates of distortion-corrected image data IMC, and outputs a result thereof as the distortion-corrected image data IMC. The distortion correction circuit 110 corresponds to a reverse warp engine or a forward warp engine. The reverse warp is warp processing of converting pixel coordinates of the distortion-corrected image data IMC into reference coordinates corresponding to the pixel coordinates, and obtaining pixel data of the distortion-corrected image data IMC from pixel data of the input image data IMA at the reference coordinates. The forward warp is warp processing of converting pixel coordinates of the input image data IMA into movement destination coordinates corresponding to the pixel coordinates, and obtaining pixel data of the distortion-corrected image data IMC at the movement destination coordinates from pixel data of the input image data IMA at the pixel coordinates. The coordinate conversions in the reverse warp and the forward warp are defined by a warp parameter. The warp parameter is a table in which coordinates of the input image data IMA and coordinates of the distortion-corrected image data IMC are associated with each other, a table indicating a movement amount between the coordinates of the input image data IMA and the coordinates of the distortion-corrected image data IMC, a coefficient of a polynomial for associating the coordinates of the input image data IMA with the coordinates of the distortion-corrected image data IMC, or the like.

The luminance analysis circuit 125 analyzes luminance of the distortion-corrected image data IMC, and outputs an analysis result thereof as the luminance information YA.

The dimming circuit 135 performs the dimming and the light amount compensation based on the luminance information YA and the detection result LDET of the light amount abnormality, and outputs the light amount information DIM of the light sources.

The color correction circuit 115 performs the color correction on the distortion-corrected image data IMC based on the light amount information DIM of the light sources. The output circuit 130 transmits the image data from the color correction circuit 115 to the display unit 300 as the output image data IMB.

Figure 9:
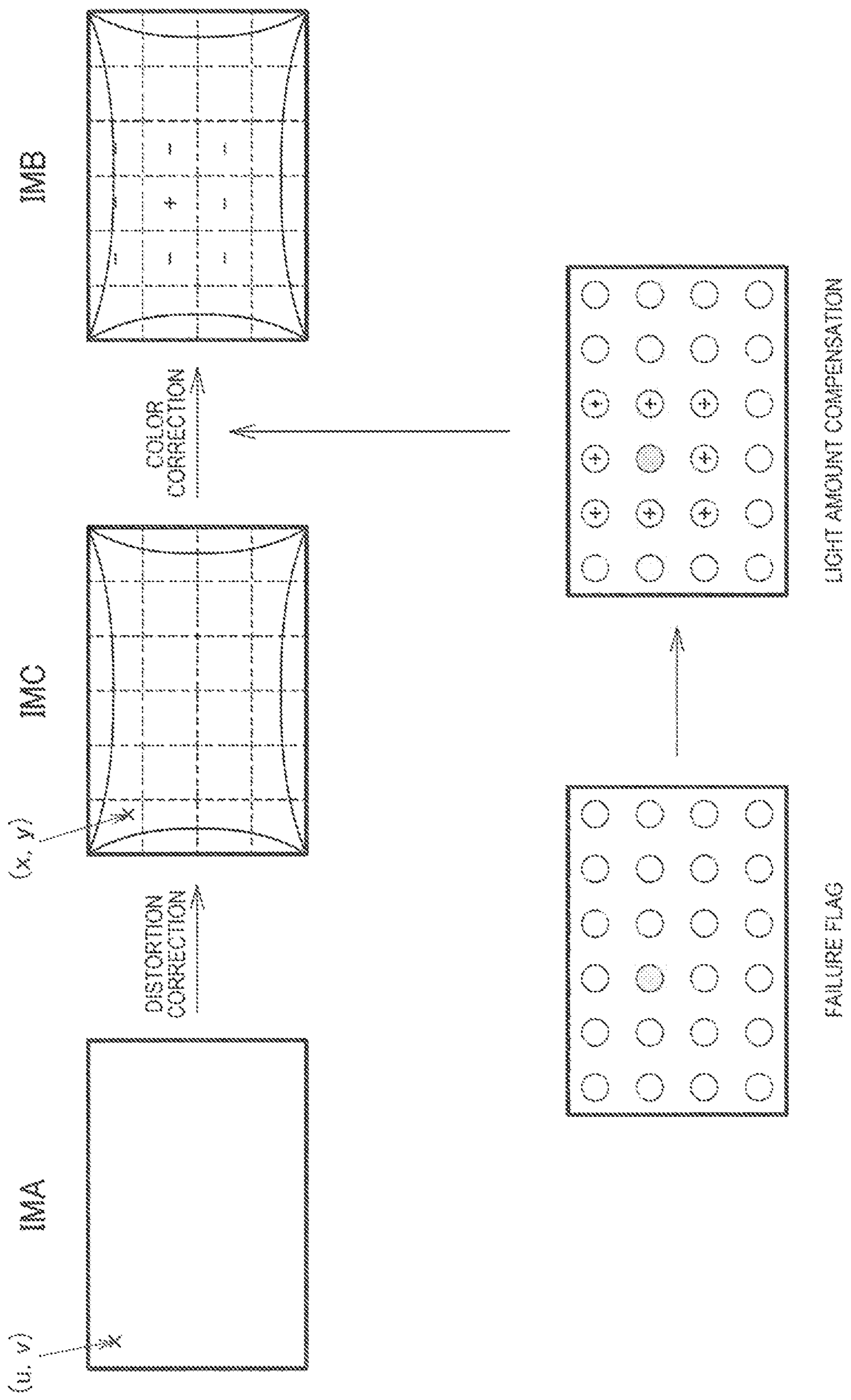
FIG. 9 shows an example of processing performed by the circuit device of the second detailed configuration example when a light amount abnormality occurs.

FIG. 9 shows an example of processing performed by the circuit device 100 of the second detailed configuration example when a light amount abnormality occurs. FIG. 9 shows an example of a case where the light emitting element is turned off due to the open circuit of the light emitting element.

As shown in the upper left diagram, the pixel coordinates of the input image data IMA are indicated by (u, v). As shown in the upper middle diagram, the pixel coordinates of the distortion-corrected image data IMC are indicated by (x, y). u and x are coordinates in the horizontal scanning direction, and v and y are coordinates in the perpendicular scanning direction. The distortion correction circuit 110 performs the coordinate conversion between the coordinates (u, v) of the input image data IMA and the coordinates (x, y) of the distortion-corrected image data IMC, and maps the input image data IMA to the distortion-corrected image data IMC based on a result thereof.

As shown in the lower diagram, the dimming circuit 135 compensates for a light amount of an abnormal light source by using surrounding light sources based on a failure flag.

As shown in the upper right diagram, the color correction circuit 115 performs the color correction on the distortion-corrected image data IMC, and the output circuit 130 outputs the image data from the color correction circuit 115 as the output image data IMB. Since the color correction is performed after the distortion correction, an area corresponding to each light source of the distortion-corrected image data IMC may be regarded as the same as an area corresponding to each light source of the output image data IMB.

The same applies to the dimming such as the local dimming based on a luminance analysis result. That is, since a luminance analysis target is the distortion-corrected image data IMC, an area corresponding to each light source in the luminance information may be regarded as the same as the area corresponding to each light source of the output image data IMB.

In the present embodiment described above, the circuit device 100 includes the distortion correction circuit 110. The distortion correction circuit 110 performs the distortion correction on the input image data IMA, and outputs the distortion-corrected image data IMC. The color correction circuit 115 receives the distortion-corrected image data IMC as image data, and performs the color correction on the distortion-corrected image data IMC.

According to the present embodiment, since the color correction is performed after the distortion correction, the area corresponding to each light source of the distortion-corrected image data IMC and an area corresponding to each light source on the display panel can be regarded as the same as each other. Accordingly, it is not necessary to consider the distortion correction in the color correction.

6. Third Detailed Configuration Example of Circuit Device

Figure 10:
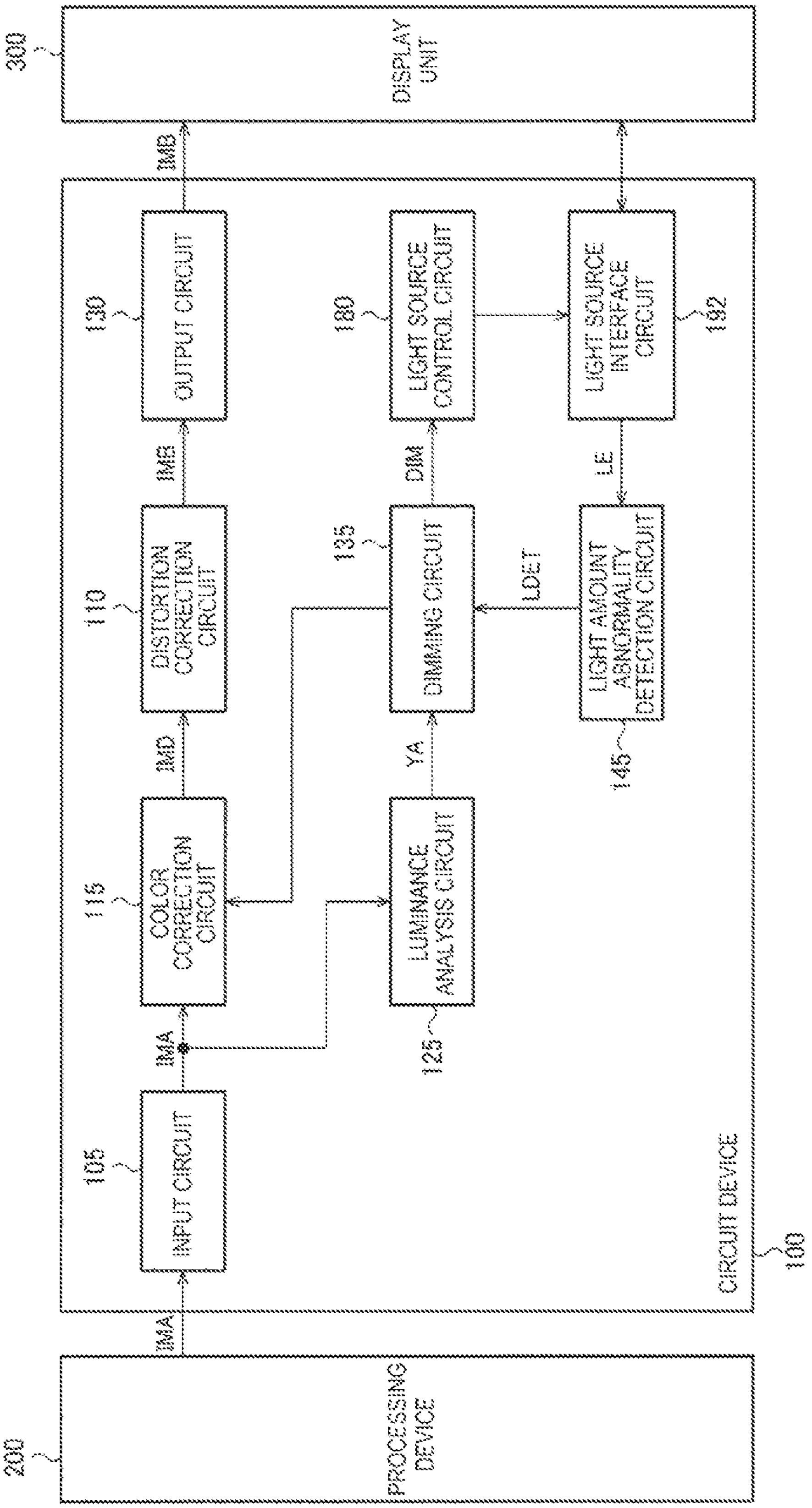
FIG. 10 shows a third detailed configuration example of the circuit device.

FIG. 10 shows a third detailed configuration example of the circuit device 100 that can be applied to the head-up display apparatus 50 or the like. The circuit device 100 includes the input circuit 105, the distortion correction circuit 110, the color correction circuit 115, the luminance analysis circuit 125, the output circuit 130, the dimming circuit 135, the light amount abnormality detection circuit 145, the light source control circuit 180, and the light source interface circuit 192. Description of parts similar to those in the configuration example of FIG. 3 or 8 is omitted.

The luminance analysis circuit 125 analyzes the luminance of the input image data IMA, and outputs an analysis result thereof as the luminance information YA.

The dimming circuit 135 performs the dimming and the light amount compensation based on the luminance information YA and the detection result LDET of the light amount abnormality, and outputs the light amount information DIM of the light sources.

The color correction circuit 115 performs the color correction on the input image data IMA based on the light amount information DIM of the light sources, and outputs color-corrected image data IMD.

The distortion correction circuit 110 performs the distortion correction on the color-corrected image data IMD by using the coordinate conversion between pixel coordinates of the color-corrected image data IMD and pixel coordinates of the output image data IMB. The output circuit 130 transmits the image data from the distortion correction circuit 110 to the display unit 300 as the output image data IMB.

Figure 11:
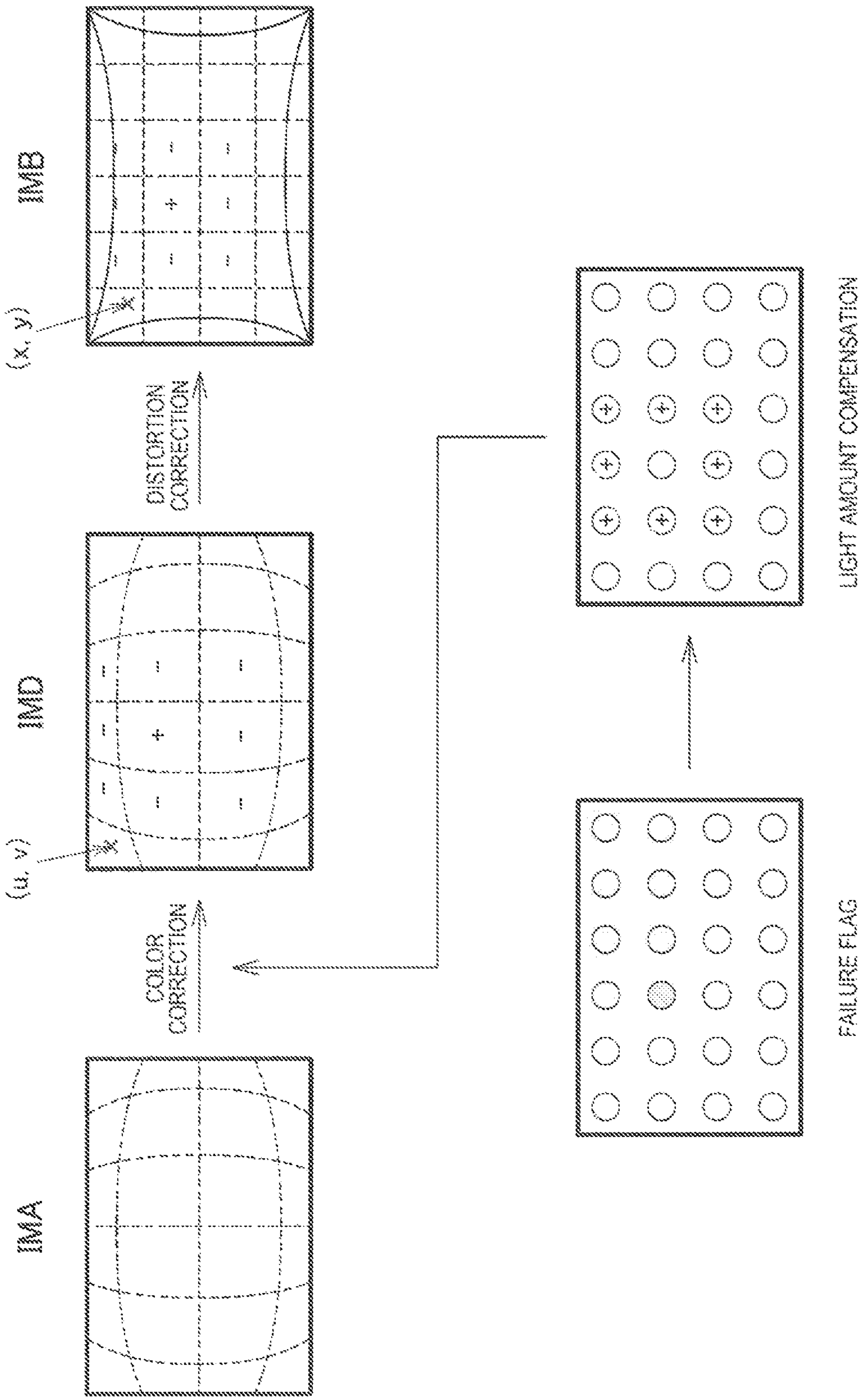
FIG. 11 shows an example of processing performed by the circuit device of the third detailed configuration example when a light amount abnormality occurs.

FIG. 11 shows an example of processing performed by the circuit device 100 of the third detailed configuration example when a light amount abnormality occurs. FIG. 11 shows an example of a case where the light emitting element is turned off due to the open circuit of the light emitting element.

As shown in the lower diagram, the dimming circuit 135 compensates for a light amount of an abnormal light source by using surrounding light sources based on a failure flag.

As shown in the upper left diagram and the middle diagram, the color correction circuit 115 performs the color correction on the input image data IMA, and outputs the color-corrected image data IMD. Pixel coordinates of the color-corrected image data IMD are indicated by (u, v).

As shown in the upper right diagram, pixel coordinates of the output image data IMB are indicated by (x, y). The distortion correction circuit 110 performs the coordinate conversion between the coordinates (u, v) of the color-corrected image data IMD and the coordinates (x, y) of the output image data IMB, and maps the color-corrected image data IMD to the output image data IMB based on a result thereof.

As shown in the upper left to right diagrams, since the color correction is performed before the distortion correction, an area corresponding to each light source of the input image data IMA that is a color correction target is different from an area corresponding to each light source of the output image data IMB. The area corresponding to each light source of the input image data IMA is referred to as an input-image-side area. The color correction circuit 115 determines the input-image-side area based on correspondence between (u, v) and (x, y) in the distortion correction. The color correction circuit 115 acquires, for example, correspondence information between (u, v) and (x, y) from the distortion correction circuit 110. Alternatively, a storage circuit (not shown) may store table information indicating the correspondence between (u, v) and (x, y), and the color correction circuit 115 may determine the input-image-side area based on the table information.

The same applies to the dimming such as the local dimming based on a luminance analysis result. That is, since the luminance analysis target is the input image data IMA, an area corresponding to each light source in the luminance information is different from the area corresponding to each light source of the output image data IMB. The dimming circuit 135 determines the area corresponding to each light source in the luminance information based on the correspondence between (u, v) and (x, y) in the distortion correction.

In the present embodiment, the circuit device 100 includes the distortion correction circuit 110. The distortion correction circuit 110 performs the distortion correction on the color-corrected image data IMD output from the color correction circuit 115, and outputs the distortion-corrected image data. The input image data IMA is input as the image data to the color correction circuit 115. Areas corresponding to the adjustment target light sources of the distortion-corrected image data and the input-image-side areas of the input image data IMA correspond to each other in the distortion correction. At this time, the color correction circuit 115 performs the color correction on the input image data IMA of the input-image-side areas, and outputs the color-corrected image data IMD to the distortion correction circuit 110.

According to the present embodiment, since the color correction is performed before the distortion correction, the input-image-side area corresponding to each light source of the color-corrected image data IMD and the area corresponding to each light source on the display panel are different from each other. Since coordinates of the color-corrected image data IMD and coordinates of the display panel are associated with each other in the distortion correction, the color correction circuit 115 can determine correspondence between the input-image-side area and the area corresponding to each light source on the display panel.

In the example of FIG. 10, the distortion-corrected image data corresponds to the output image data IMB, and is output from the output circuit 130 to an outside of the circuit device 100. However, the configuration is not limited to the configuration of FIG. 10, and a circuit that performs some kind of image processing may be further provided between the distortion correction circuit 110 and the output circuit 130.

7. Fourth Detailed Configuration Example of Circuit Device

Figure 12:
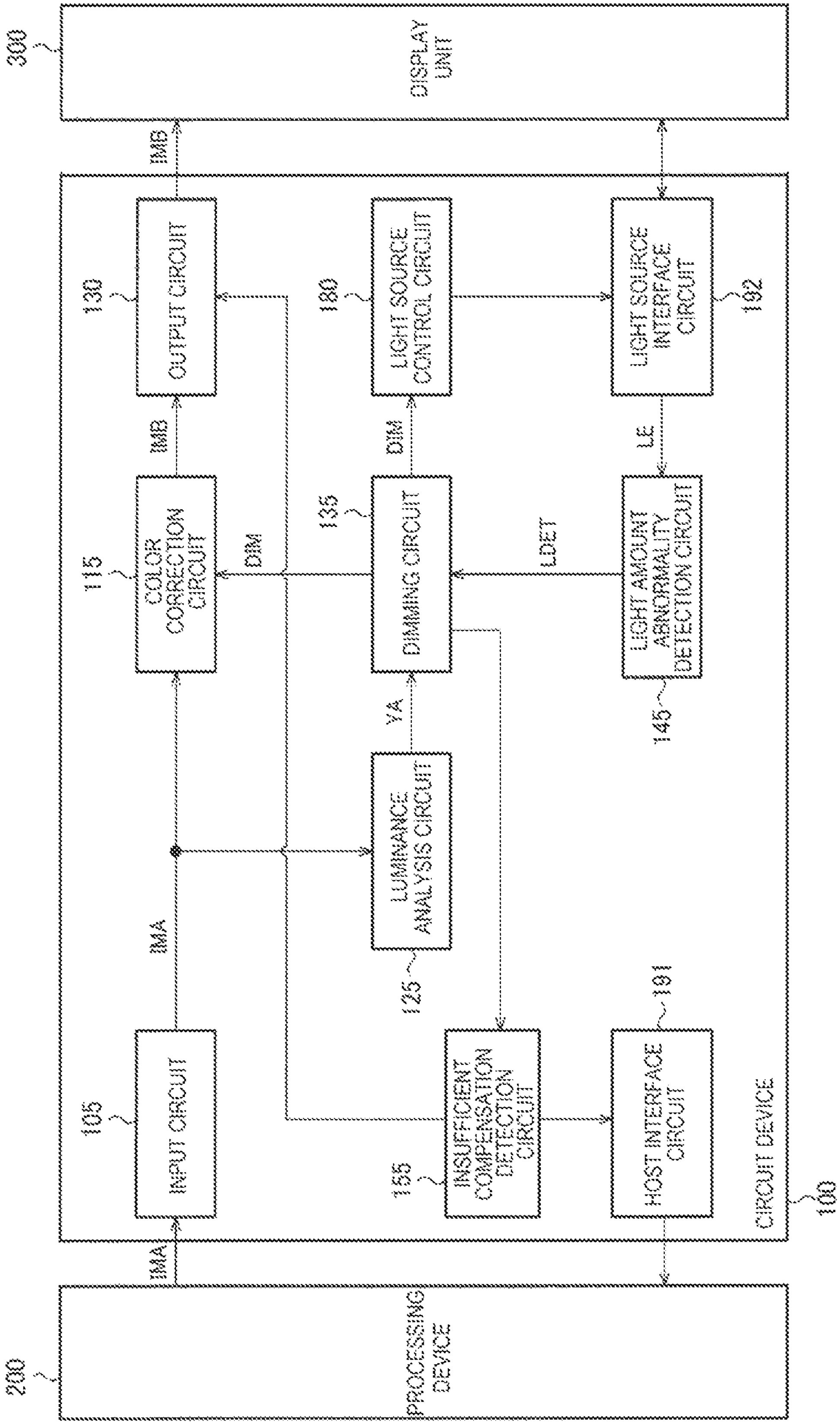
FIG. 12 shows a fourth detailed configuration example of the circuit device.

FIG. 12 shows a fourth detailed configuration example of the circuit device 100. The circuit device 100 includes the input circuit 105, the color correction circuit 115, the luminance analysis circuit 125, the output circuit 130, the dimming circuit 135, the light amount abnormality detection circuit 145, an insufficient compensation detection circuit 155, the light source control circuit 180, the host interface circuit 191, and the light source interface circuit 192. Description of parts similar to those in the configuration example of FIG. 3 is omitted. FIG. 12 shows an example in which the insufficient compensation detection circuit 155 and the host interface circuit 191 are combined in the first detailed configuration example, but the insufficient compensation detection circuit 155 and the host interface circuit 191 may be combined in the second detailed configuration example or the third detailed configuration example.

The insufficient compensation detection circuit 155 detects insufficient compensation of a light amount based on information from the dimming circuit 135. As an example, the insufficient compensation detection circuit 155 determines that a light amount is insufficiently compensated when light amounts cannot be increased because the light amounts of light sources around an abnormal light source are close to a maximum light amount, or when the light amounts cannot be decreased because the light amounts of the light sources around the abnormal light source are close to a minimum light amount.

The host interface circuit 191 communicates with the processing device 200 that is a host of the circuit device 100. The host interface circuit 191 may be various communication interfaces used for communication between circuit devices, and is, for example, the SPI or the I2C. The host interface circuit 191 and the light source interface circuit 192 are not limited to separately provided interface circuits, and may be one common interface circuit.

When the insufficient compensation detection circuit 155 detects the insufficient compensation of the light amount, the host interface circuit 191 notifies the processing device 200 of the information. When notified of the insufficient compensation of the light amount, the processing device 200 may transmit a display notifying occurrence of an abnormality to the circuit device 100 in addition to the input image data IMA. Alternatively, when the insufficient compensation detection circuit 155 detects the insufficient compensation of the light amount, the output circuit 130 of the circuit device 100 may transmit the display notifying the occurrence of the abnormality to the display apparatus 40 in addition to the output image data IMB.

In the present embodiment described above, the circuit device 100 includes the host interface circuit 191. When light amount compensation of an area corresponding to the abnormal light source is insufficient even if the light amount compensation processing is performed, the host interface circuit 191 outputs an error signal to the host.

According to the present embodiment, when the light amount compensation of the area corresponding to the abnormal light source is insufficient even if the light amount compensation processing is performed, the host can execute processing of handling the insufficient compensation. In the example of FIG. 12, the host corresponds to the processing device 200.

The circuit device according to the present embodiment described above is used in the display apparatus. The display apparatus includes the display panel and the backlight including the plurality of light sources. The plurality of light sources are respectively provided corresponding to the plurality of areas of the display panel. The circuit device includes the light amount abnormality detection circuit, the dimming circuit, and the color correction circuit. The light amount abnormality detection circuit detects a light amount abnormality of each light source. The dimming circuit performs the light amount compensation processing of compensating for the light amount of the area corresponding to the abnormal light source by adjusting the light amounts of the light sources other than the abnormal light source that is the light source in which the light amount abnormality is detected. The color correction circuit performs the color correction according to the adjusted light amounts on the image data of the areas corresponding to the adjustment target light sources that are the light sources whose light amounts are adjusted.

According to the present embodiment, the light amount of the area corresponding to the abnormal light source is compensated, and the color correction is performed according to the adjusted light amounts on the image data of the areas corresponding to the adjustment target light sources. Accordingly, since a result of the color correction and a result of the light amount compensation cancel each other, even if an abnormality occurs in the light source, it is possible to provide a natural display image as if no abnormality occurs in the light source.

In the present embodiment, the dimming circuit may perform the light amount compensation processing by setting the light sources around the abnormal light source among the plurality of light sources as the adjustment target light sources.

On the display panel, the area illuminated by a certain light source and the areas illuminated by the light sources around the certain light source normally overlap each other. Therefore, the light amount of the area corresponding to the abnormal light source is compensated by adjusting the light amounts of the light sources around the abnormal light source.

In the present embodiment, when the dimming circuit increases the light amounts of the adjustment target light sources, the color correction circuit may perform the color correction of decreasing the luminance of the image data of the areas corresponding to the adjustment target light sources.

According to the present embodiment, the increase in the light amount because of the light amount compensation and the decrease in the luminance of the image data because of the color correction cancel each other in the areas corresponding to the adjustment target light sources. Accordingly, even if the open-circuit failure or the abnormality of the light amount decrease occurs in the light source, it is possible to provide a natural display image.

In the present embodiment, when the dimming circuit decreases the light amounts of the adjustment target light sources, the color correction circuit may perform the color correction of increasing the luminance of the image data of the areas corresponding to the adjustment target light sources.

According to the present embodiment, the decrease in the light amount because of the light amount compensation and the increase in the luminance of the image data because of the color correction cancel each other in the areas corresponding to the adjustment target light sources. Accordingly, even if the short-circuit failure or the abnormality of the light amount increase occurs in the light source, it is possible to provide a natural display image.

In the present embodiment, the dimming circuit may perform the dimming control of controlling the light amount of each light source based on the image data of each area. The color correction circuit may perform the color correction on the image data of each area based on the light amount controlled by the dimming control.

According to the present embodiment, it is possible to perform the dimming control such as the local dimming. The light amount compensation and the color correction accompanying the light amount compensation have the mechanism similar to the light amount control in the dimming control and the color correction of the image data according to the light amount control. Therefore, the dimming circuit used for the dimming control and the color correction circuit can be used in combination for the light amount compensation and the color correction accompanying the light amount compensation.

In the present embodiment, the circuit device may include the distortion correction circuit. The distortion correction circuit may perform the distortion correction on the input image data, and output the distortion-corrected image data. The color correction circuit may receive the distortion-corrected image data as the image data, and perform the color correction on the distortion-corrected image data.

According to the present embodiment, since the color correction is performed after the distortion correction, the area corresponding to each light source of the distortion-corrected image data and the area corresponding to each light source on the display panel can be regarded as the same as each other. Accordingly, it is not necessary to consider the distortion correction in the color correction.

In the present embodiment, the circuit device may include the distortion correction circuit. The distortion correction circuit may perform the distortion correction on the color-corrected image data output from the color correction circuit, and output the distortion-corrected image data. The color correction circuit may receive the input image data as the image data. When the areas corresponding to the adjustment target light sources of the distortion-corrected image data and the input-image-side areas of the input image data correspond to each other in the distortion correction, the color correction circuit may perform the color correction on the input image data of the input-image-side areas, and output the color-corrected image data to the distortion correction circuit.

According to the present embodiment, since the color correction is performed before the distortion correction, the input-image-side area corresponding to each light source of the color-corrected image data and the area corresponding to each light source on the display panel are different from each other. Since the coordinates of the color-corrected image data and the coordinates of the display panel are associated with each other in the distortion correction, the color correction circuit can determine the correspondence between the input-image-side area and the area corresponding to each light source on the display panel.

In the present embodiment, the circuit device may include the light source interface circuit. The light source interface circuit may perform the interface processing with the light source driver that drives the plurality of light sources. The light amount abnormality detection circuit may acquire the failure information on the light source from the light source driver via the light source interface circuit, and detect the light amount abnormality based on the failure information.

According to the present embodiment, the light amount abnormality detection circuit can acquire the failure information on the light source detected by the light source driver via the light source interface circuit. The light amount abnormality detection circuit can detect the light amount abnormality based on the failure information.

In the present embodiment, the failure information may include at least one of the open-circuit information and the short-circuit information on the light emitting element of each light source.

According to the present embodiment, the light amount abnormality detection circuit can detect whether the light emitting element of the light source in which the abnormality occurs has the open circuit or the short circuit. Accordingly, the dimming circuit can execute the light amount compensation according to content of the abnormality.

In the present embodiment, the circuit device may include the host interface circuit. When the light amount compensation of the area corresponding to the abnormal light source is insufficient even if the light amount compensation processing is performed, the host interface circuit may output the error signal to the host.

According to the present embodiment, when the light amount compensation of the area corresponding to the abnormal light source is insufficient even if the light amount compensation processing is performed, the host can execute the processing of handling the insufficient compensation.

The display apparatus according to the present embodiment relates to a display apparatus including the circuit device described in any one of the above, the display panel that displays the image based on the image data, and the backlight.

Although the present embodiment has been described in detail as described above, it will be readily apparent to those skilled in the art that many modifications may be made without departing substantially from novel matters and effects of the present disclosure. Therefore, all such modifications are intended to be included within the scope of the present disclosure. For example, a term described at least once together with a different term having a broader meaning or the same meaning in the description or the drawings can be replaced with the different term in any place in the description or the drawings. Further, all combinations of the present embodiment and the modifications are also included in the scope of the present disclosure. Further, configurations, operations, and the like of the circuit device, the display unit, the processing device, the display apparatus, the head-up display apparatus, and the like are not limited to those described in the present embodiment, and various modifications can be made.

What is claimed is:

1. A circuit device used in a display apparatus, the display apparatus including a display panel and a backlight including a plurality of light sources and in which the plurality of light sources are respectively provided corresponding to a plurality of areas of the display panel, the circuit device comprising:

a light amount abnormality detection circuit configured to detect a light amount abnormality of the light source;

a dimming circuit configured to perform light amount compensation processing of compensating for a light amount of an area corresponding to an abnormal light source by adjusting a light amount of a light source other than the abnormal light source that is a light source in which the light amount abnormality is detected; and a color correction circuit configured to perform color correction according to the adjusted light amount on image data of an area corresponding to an adjustment target light source that is the light source whose light amount is adjusted.

2. The circuit device according to claim 1, wherein the dimming circuit performs the light amount compensation processing by setting a light source around the abnormal light source among the plurality of light sources as the adjustment target light source.

3. The circuit device according to claim 1, wherein when the dimming circuit increases a light amount of the adjustment target light source, the color correction circuit performs the color correction of decreasing luminance of the image data of the area corresponding to the adjustment target light source.

4. The circuit device according to claim 1, wherein when the dimming circuit decreases a light amount of the adjustment target light source, the color correction circuit performs the color correction of increasing luminance of the image data of the area corresponding to the adjustment target light source.

5. The circuit device according to claim 1, wherein the dimming circuit performs dimming control of controlling a light amount of the light source based on image data of each area, and the color correction circuit performs the color correction on the image data of each area based on a light amount controlled by the dimming control.

6. The circuit device according to claim 1, further comprising:

a distortion correction circuit configured to perform distortion correction on input image data and output distortion-corrected image data, wherein the color correction circuit receives the distortion-corrected image data as the image data, and performs the color correction on the distortion-corrected image data.

7. The circuit device according to claim 1, further comprising:

a distortion correction circuit configured to perform distortion correction on color-corrected image data output from the color correction circuit and output distortion-corrected image data, wherein the color correction circuit receives input image data as the image data, and when the area corresponding to the adjustment target light source of the distortion-corrected image data and an input-image-side area of the input image data correspond to each other in the distortion correction, the color correction circuit performs the color correction on the input image data of the input-image-side area and outputs the color-corrected image data to the distortion correction circuit.

8. The circuit device according to claim 1, further comprising:

a light source interface circuit configured to perform interface processing with a light source driver configured to drive the plurality of light sources, wherein the light amount abnormality detection circuit acquires failure information on the light source from the light source driver via the light source interface circuit, and detects the light amount abnormality based on the failure information.

9. The circuit device according to claim 8, wherein the failure information includes at least one of open-circuit information and short-circuit information of a light emitting element of each light source.

10. The circuit device according to claim 1, further comprising:

a host interface circuit configured to output an error signal to a host when light amount compensation of the area corresponding to the abnormal light source is insufficient even if the light amount compensation processing is performed.

11. A display apparatus comprising:

the circuit device according to claim 1;

the display panel configured to display an image based on the image data; and the backlight.

* * * * *